July 8, 1941.  L. R. RHEIN  2,248,121
WINDOW REGULATOR
Filed Oct. 16, 1939  5 Sheets-Sheet 1
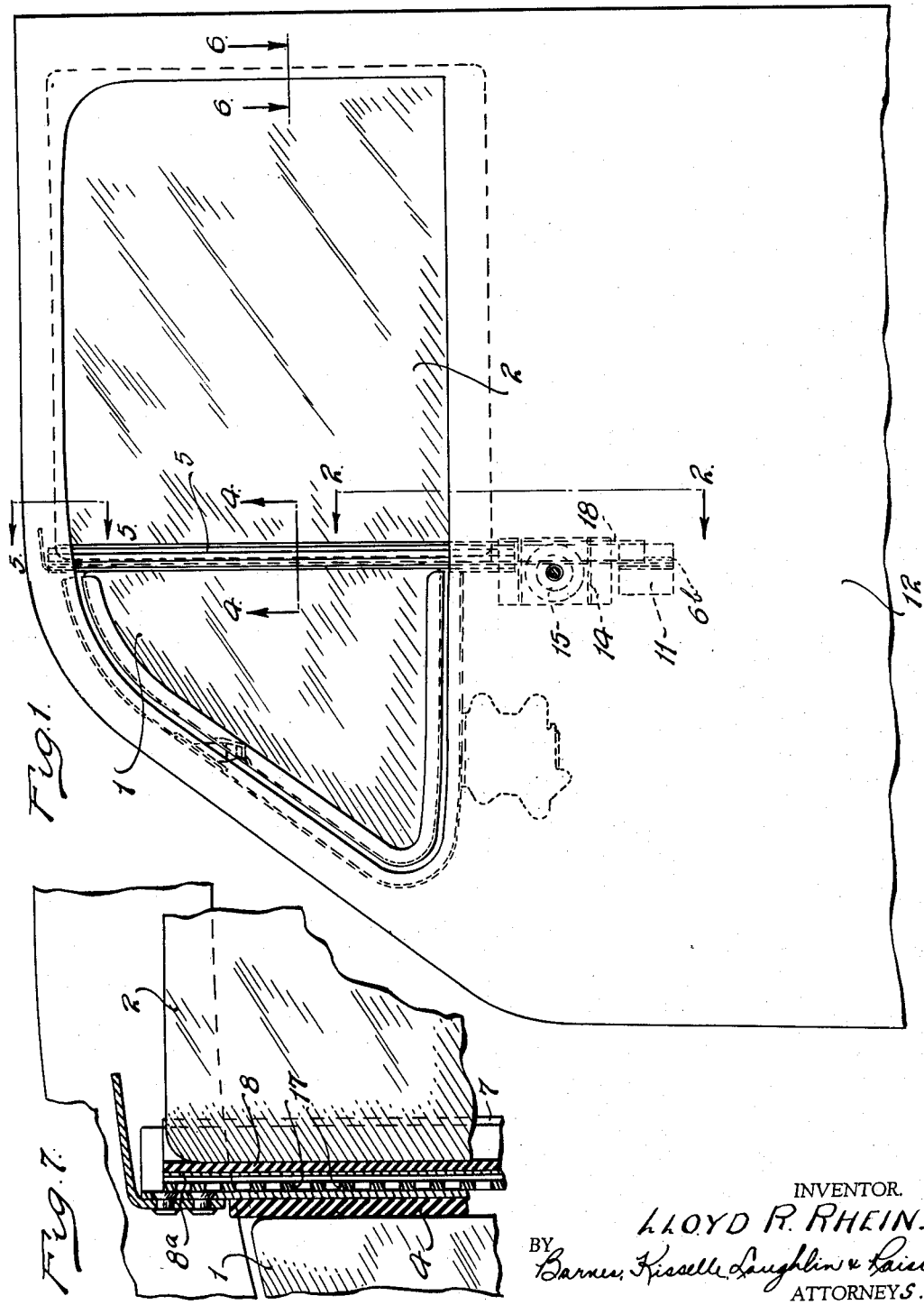
INVENTOR.
LLOYD R. RHEIN.
BY
ATTORNEYS.

July 8, 1941.   L. R. RHEIN   2,248,121
WINDOW REGULATOR
Filed Oct. 16, 1939   5 Sheets-Sheet 2
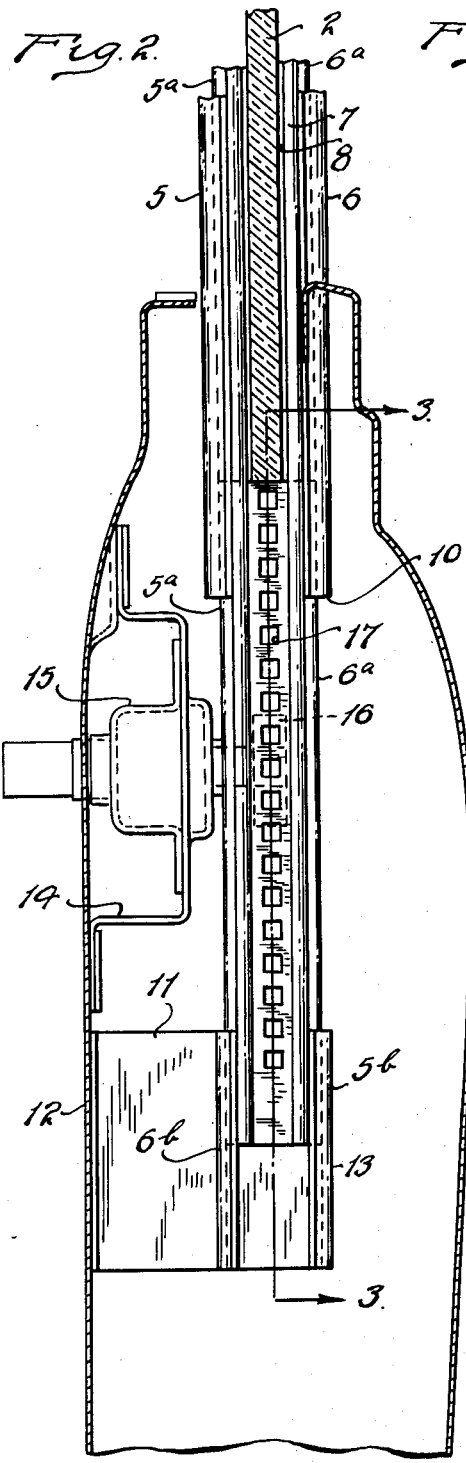
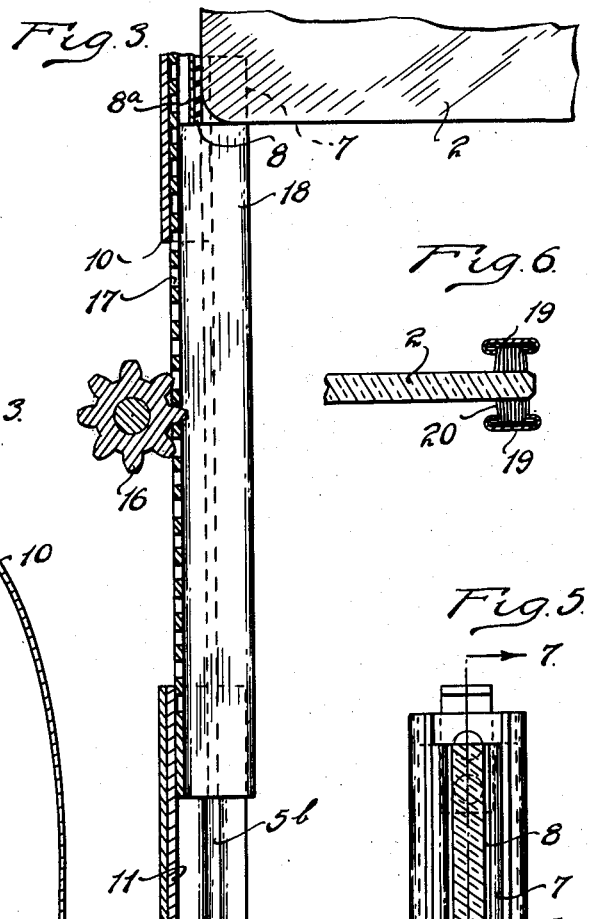
INVENTOR.
LLOYD R. RHEIN
BY Barnes, Kisselle, Laughlin & Raisch
ATTORNEYS.

July 8, 1941.   L. R. RHEIN   2,248,121
WINDOW REGULATOR
Filed Oct. 16, 1939   5 Sheets-Sheet 3
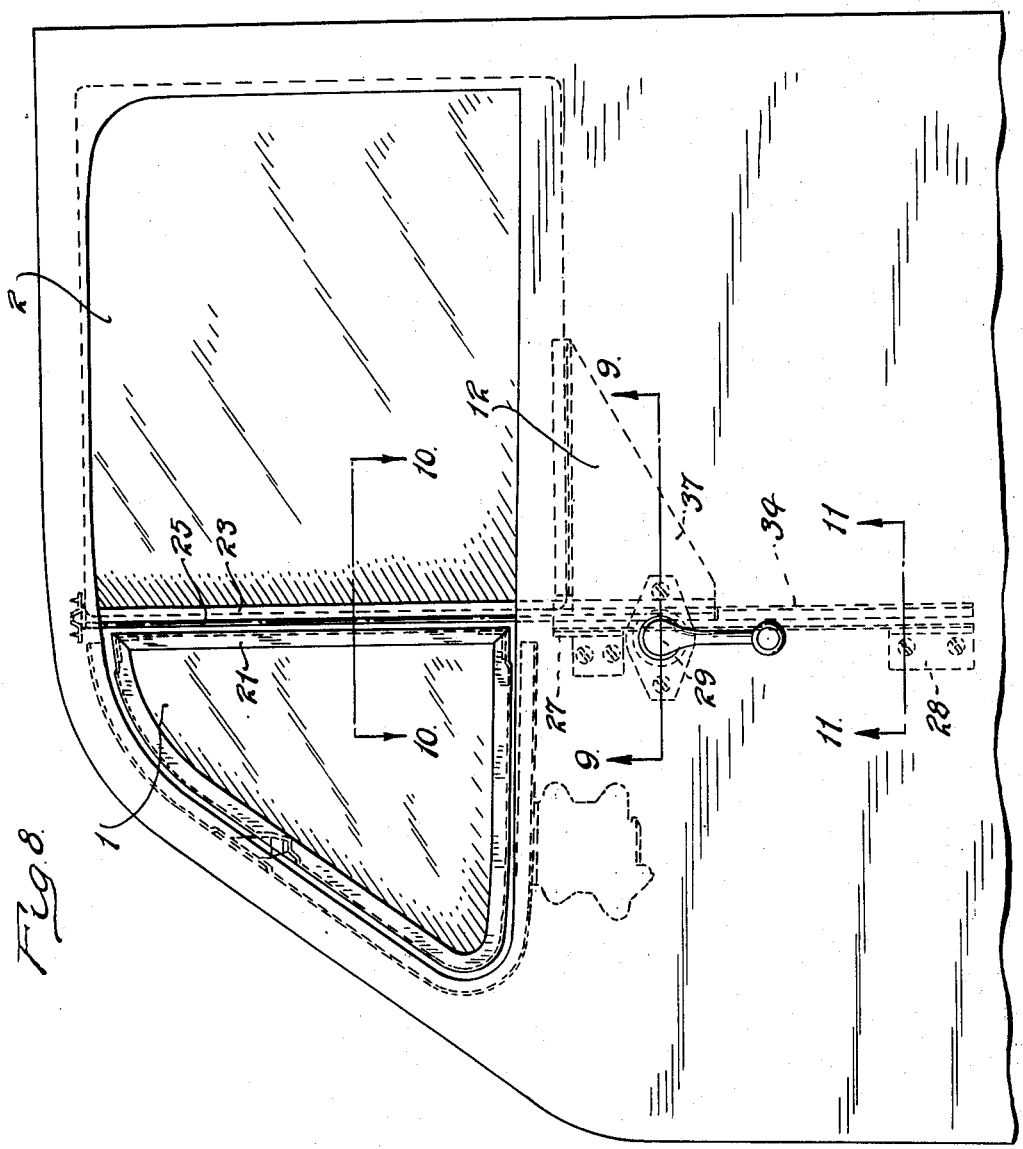
INVENTOR.
LLOYD R. RHEIN
BY Barnes, Kisselle, Laughlin & Raisch
ATTORNEYS.

July 8, 1941.   L. R. RHEIN   2,248,121
WINDOW REGULATOR
Filed Oct. 16, 1939   5 Sheets-Sheet 4
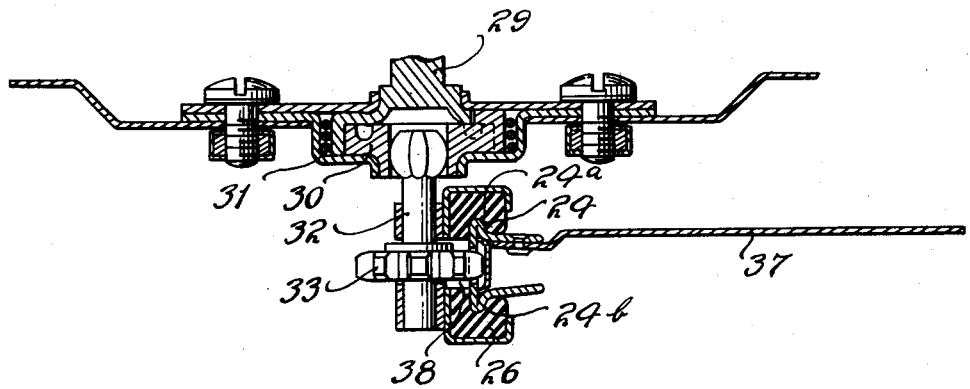
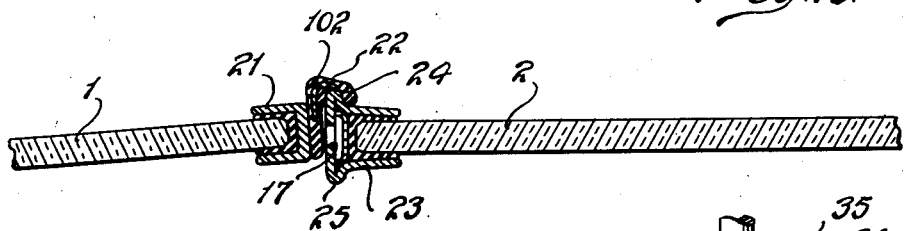
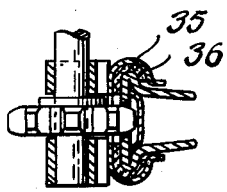
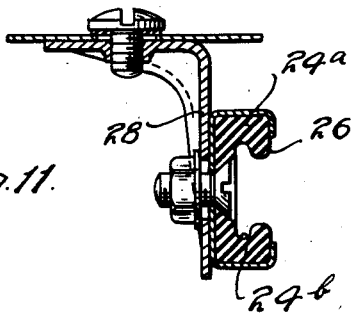
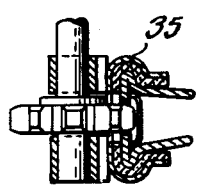
INVENTOR.
LLOYD R. RHEIN.
BY Barnes, Kisselle, Laughlin & Raisch
ATTORNEYS.

July 8, 1941.　　　L. R. RHEIN　　　2,248,121
WINDOW REGULATOR
Filed Oct. 16, 1939　　　5 Sheets-Sheet 5
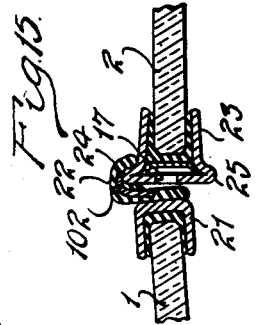
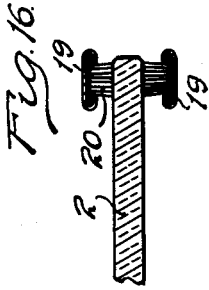
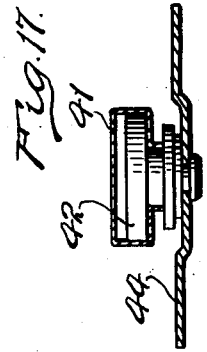
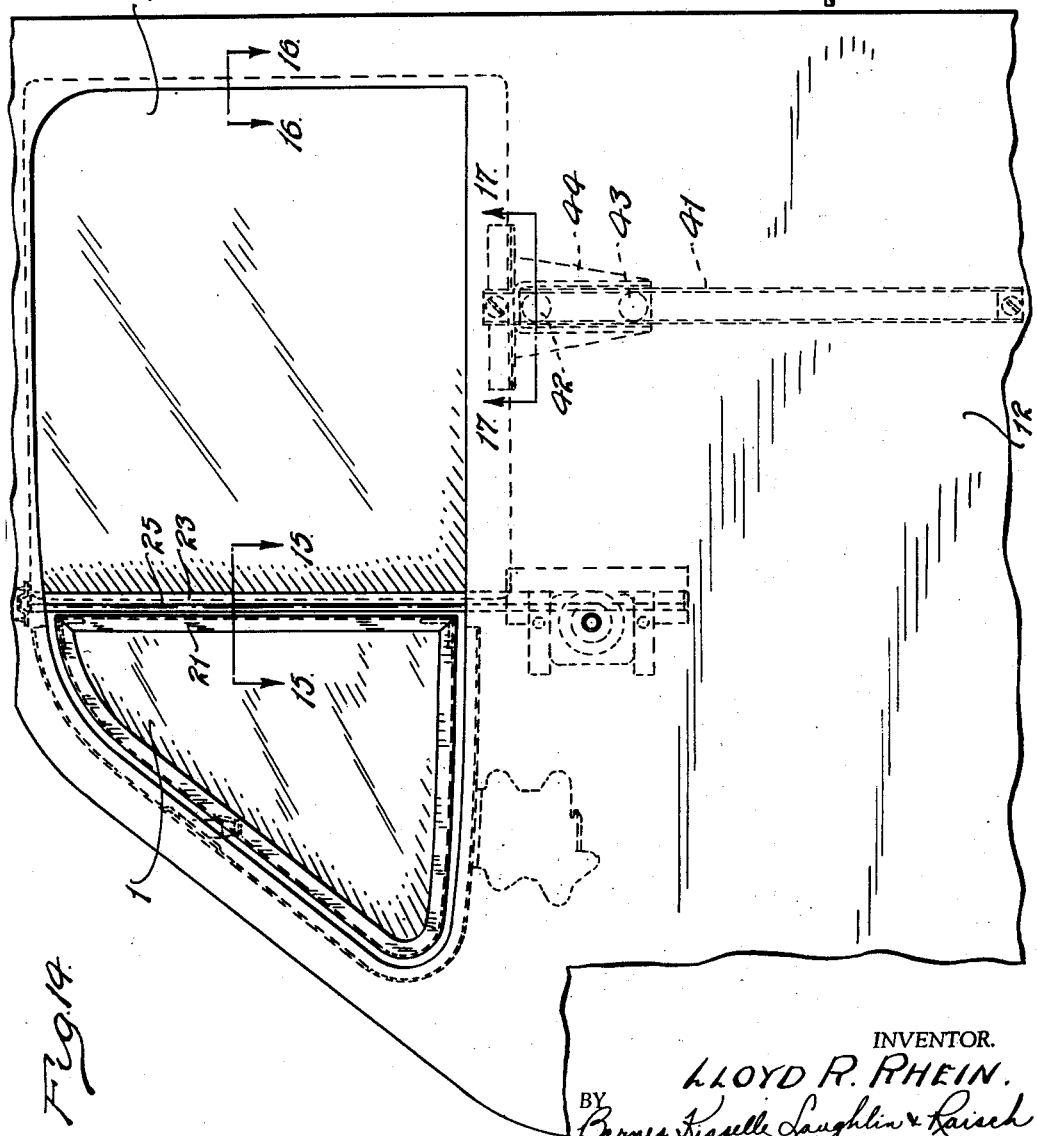
INVENTOR.
LLOYD R. RHEIN.
BY Barnes, Kisselle, Laughlin & Raisch
ATTORNEYS.

Patented July 8, 1941

2,248,121

UNITED STATES PATENT OFFICE 2,248,121

WINDOW REGULATOR

Lloyd R. Rhein, Pleasant Ridge, Mich., assignor to Ternstedt Manufacturing Company, Detroit, Mich., a corporation of Michigan Application October 16, 1939, Serial No. 299,592

1 Claim. (Cl. 296—44)

This invention relates to a window regulator and guide for the vertically sliding window of an automobile and particularly the sliding panel used in the Fisher no draft ventilator.

It is an object of the invention to provide lifting means and guide means which will be very economical to produce and yet which will amply serve the purpose.

Referring to the drawings:

Fig. 1 is a view of a Fisher no draft system with a swinging panel and a sliding panel embodying one form of my invention.

Fig. 2 is a section taken on the line 2—2 of Fig. 1.

Fig. 3 is a vertical section taken on the line 3—3 of Fig. 2.

Figs. 4, 5 and 6 are detail sections taken on the corresponding section lines of Fig. 1.

Fig. 7 is a section taken on the line 7—7 of Fig. 5.

Fig. 8 is an elevation of a door showing a different form of the invention.

Figs. 9, 10 and 11 are sections taken on the respective section lines of Fig. 8.

Figs. 12 and 13 are sections showing modified forms of window guides taken at the same point as Fig. 9.

Fig. 14 is an elevation of a door showing a further modification.

Figs. 15, 16 and 17 are sections taken on the corresponding lines of Fig. 14.

Referring to Fig. 1: 1 designates the swinging panel in a Fisher no draft type of ventilating system. 2 is the sliding panel. It is customary with these ventilating systems to have either a stationary division pillar between the swinging panel and the sliding panel, or else the division pillar takes the form of an h channel which forms the stile on one side of the sliding panel. This is sometimes called a disappearing division pillar but it is really part of the sliding panel sash.

In the form of the invention shown in Fig. 1, there is a permanent division pillar of h section designated 3 (see Fig. 4). On the upper part of the h is cemented a weatherseal 4, preferably of rubber, against which the free edge of the swinging panel 1 is adapted to seat. The division pillar 3 extends only a short distance into the window well and below the belt line to the point 10, as shown in Fig. 2, and the channel has a pair of grooves 5 and 6 that are pressed outwardly therein and form a guide for the stile or side sash bar 7 of the sliding window 2. The sliding window 2 is seated in a rubber or other yielding material strip 8. This is spaced from the bottom of the h channel by the inverted channel bar 8a. The stile 7 is made of strip metal that is folded back on its side to provide flanges or ribs 5a and 6a which fit in the corresponding groove of the division pillar. Near the center of the window well is a window guide bracket 11 which is welded to the inside door panel 12. This bracket has a window guide 13 which is exactly like the window guide of the division pillar including the grooves 5b.

Secured to the inside door panel is a window regulator designated 14 and which comprises little more than a clutch 15 and a driving pinion 16 having teeth adapted to project through slots 17 in the window stile and window stile extension 18. The stile 7, together with the turned out flanges 5a and 6a sliding in the grooves 5 and 6 and also in the grooves 5b and 6b, gives a sliding dovetail or undercut relation between the stile and the window guides. The stile and the sliding panel 2 are locked from any substantial movement in any direction. The result is that the usual channel window guide is not required at the rear edge of the window but a cheaper pair of strips 19, each with a cushioning member 20 (Fig. 6), can be used. Preferably a mohair with long bristles may be used as a weatherstrip at the rear edge of the glass to restrain the panel from movement at right angles to the plane of the glass.

In the installation shown in Fig. 8, there is no division pillar above the belt line as will be seen by examination of Fig. 10. Here, the swinging panel has a stile 21 to which is cemented an L section weatherstrip 22 with a piece of metal reinforcement 102 molded in the rubber. The stile 23 for the sliding panel 2 is a channel member which has its base enlarged to form ribs 24 and 25. These ribs are arranged to fit into the dovetail or undercut grooves 24a and 24b of a window guide or plastic material 26. This may be any one of the types of new plastic materials, such as Tenite, Bakelite, or any other phenol-condensation product. It will be seen that on these plastic strips the same numerals are located both in the upper window bracket 27 and the lower window bracket 28 shown respectively in Figs. 10 and 11. Just below the upper bracket is located the window regulator which, here, is nothing more than a clutch having a driving member 29 and a driven member 30 with an intervening coil spring to provide the usual coil spring clutch 31 now in use on window regulators. The driven member has fastened therein a drive shaft 32 and pinion 33 which engages in slots in the stile and an extension of the stile designated 34.

In Figs. 12 and 13, slightly modified forms are shown, wherein metal channel 35 carries a fabric 36 for supporting the window stile and window stile extension. 37 is a gusset plate or triangular brace between the window stile extension and the bottom of the sliding panel. It will be seen from Fig. 9 that the lifting pinion 33 engages through a slot 38 that is formed in the window guide bracket 27 and the strip of plastic material 26.

Referring to Fig. 14: It will be seen that here is a construction quite similar to that described in connection with Figs. 8–13 except here the lower window guide bracket is omitted and, in place thereof is located a central track or guide 41 in which is guided a pair of rollers 42 and 43 which are fastened to a bracket 44 secured to the bottom of the sliding panel. Only one guide 26 is necessary in this form. The lower guide bracket 28, shown in Fig. 8, may be omitted.

The guide 41 and rolls 42 and 43 is an arrangement similar to that shown and claimed in the Hickman et al. Patent 1,991,017.

I claim:

In a no draft ventilating system, the combination of a swinging panel and a sliding panel, a stile fastened to the forward edge of the sliding panel and forming a division pillar when the sliding panel is raised and acting as a stop and weatherseal for the rear edge of the swinging panel, a guide for said stile having an undercut or dovetail sliding engagement with said stile to form the sole support for the sliding panel against movement to the front or rear in the plane of the window panel, said stile or division pillar being provided with slots and a window lifting member in the form of a toothed pinion adapted to engage the slots for raising and lowering the division pillar.

LLOYD R. RHEIN.